(No Model.)
J. BAILLIE.
BRICK MACHINE.
No. 332,474. Patented Dec. 15, 1885.
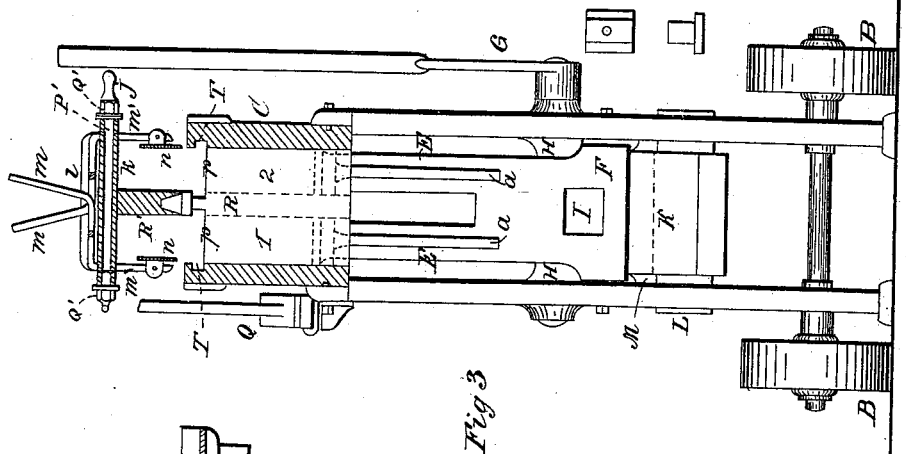
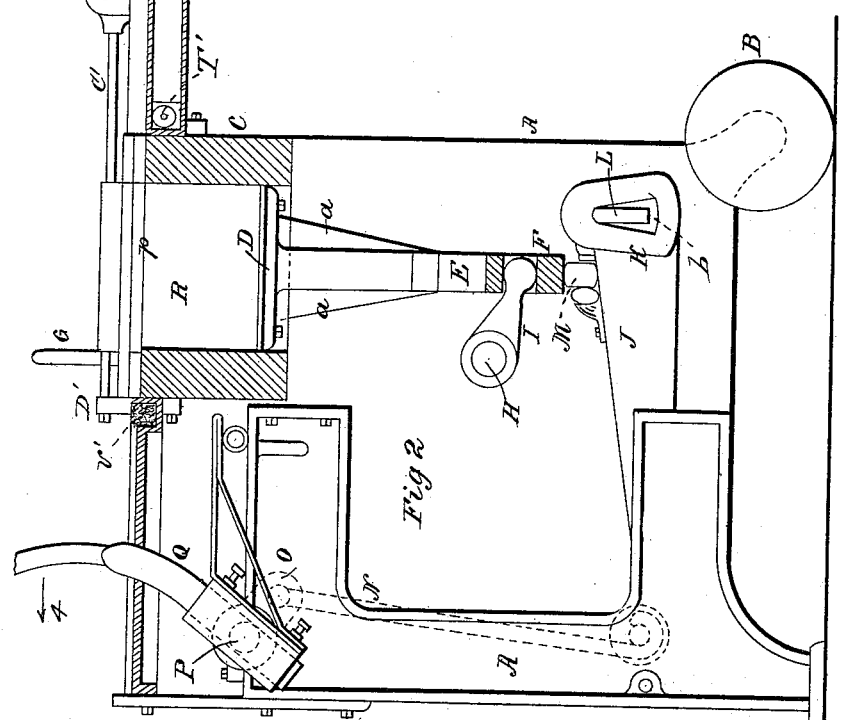
WITNESSES
G. J. Hardway
J. H. Burridge
INVENTOR
John Baillie
W. H. Burridge.
Atty (No Model.) 5 Sheets—Sheet 3.

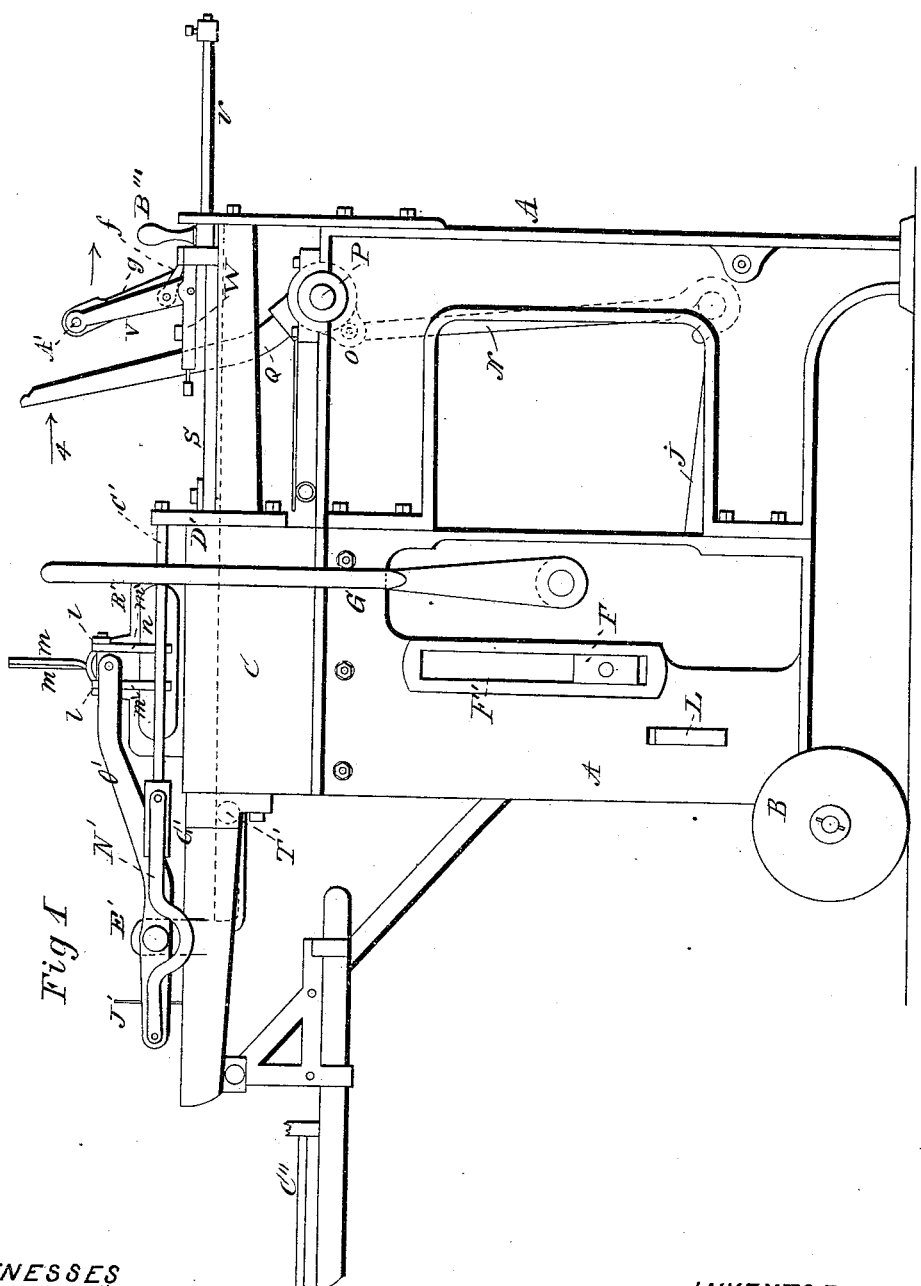

J. BAILLIE.
BRICK MACHINE.

No. 332,474. Patented Dec. 15, 1885.

WITNESSES
G. J. Hardway.
J. H. Burridge

INVENTOR
John Baillie
W. H. Burridge
Atty.

(No Model.) 5 Sheets—Sheet 4.
J. BAILLIE.
BRICK MACHINE.
No. 332,474. Patented Dec. 15, 1885.
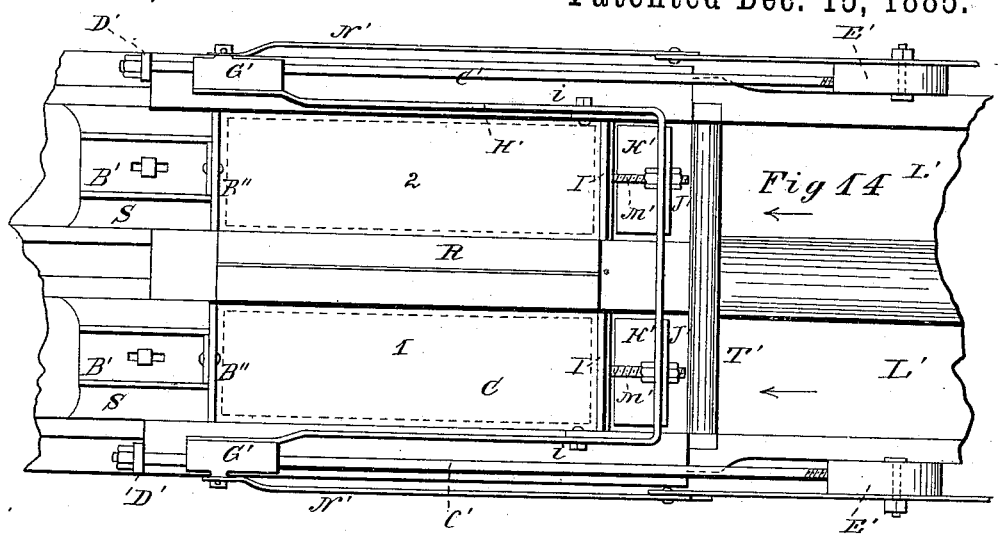
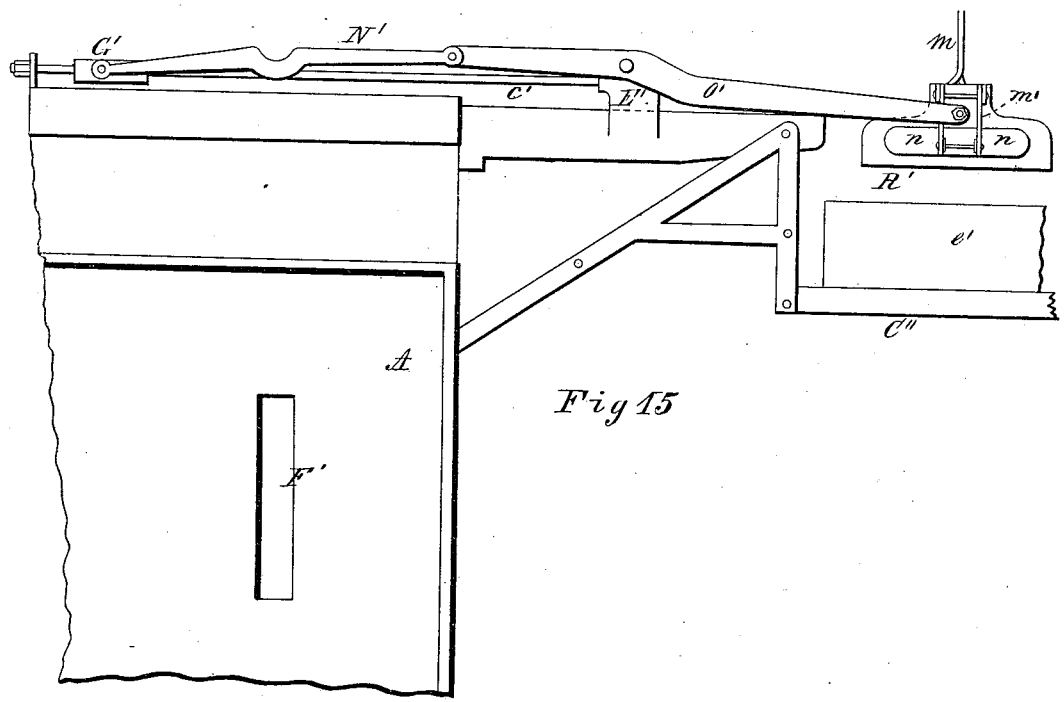
WITNESSES
G. J. Hardway.
J. H. Burridge.
INVENTOR
John Baillie
W. H. Burridge.
Atty

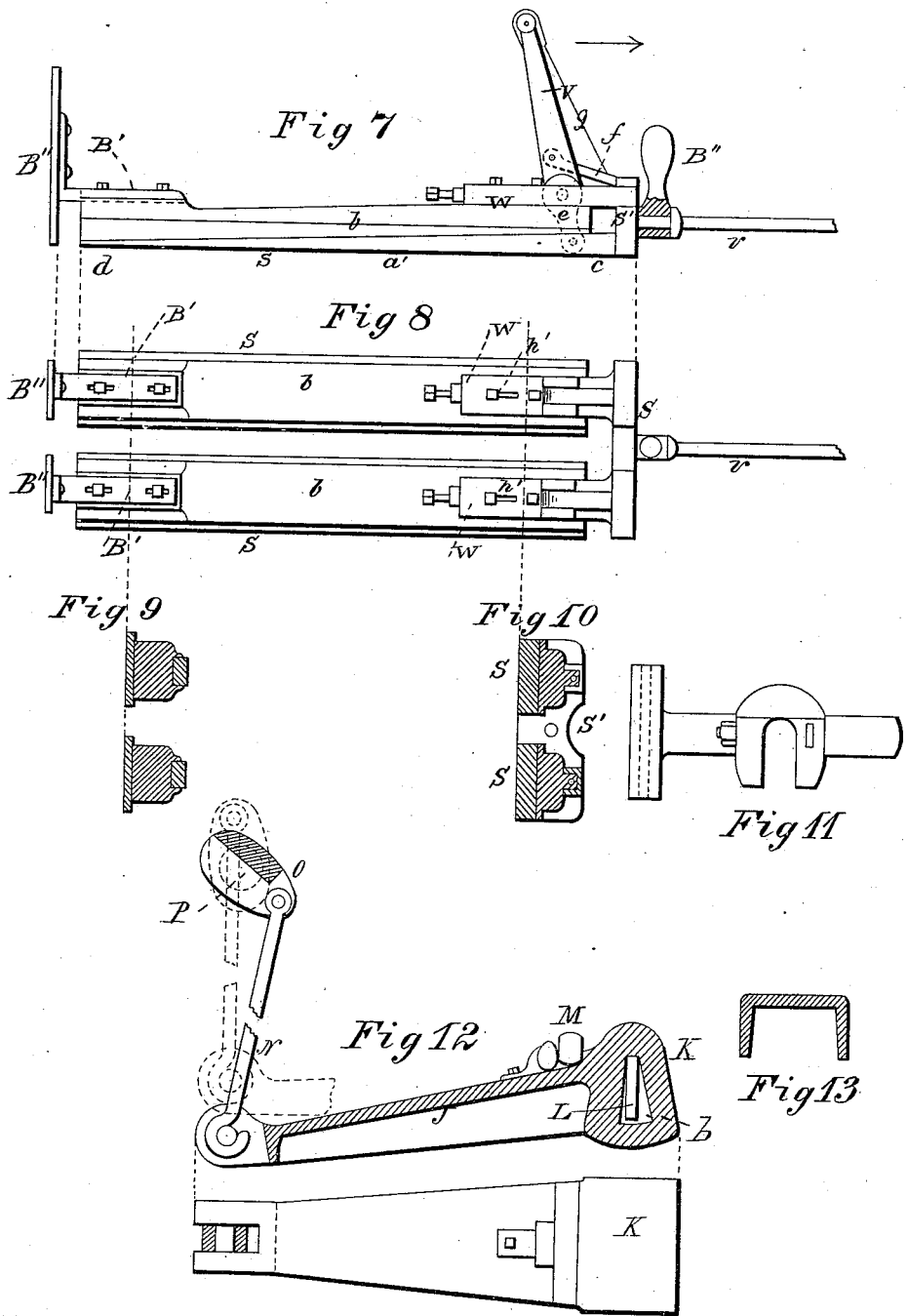

UNITED STATES PATENT OFFICE.

JOHN BAILLIE, OF SALEM, OHIO.

BRICK-MACHINE.

SPECIFICATION forming part of Letters Patent No. 332,474, dated December 15, 1885.

Application filed May 25, 1885. Serial No. 166,548. (No model.)

*To all whom it may concern:*

Be it known that I, JOHN BAILLIE, of Salem, in the county of Columbiana and State of Ohio, have invented a certain new and Improved Brick-Machine; and I do hereby declare the following to be a full and complete description of the same.

The brick-machine above referred to is fully described in the following specification and shown in the accompanying drawings, making a part of the same.

Figure 4:
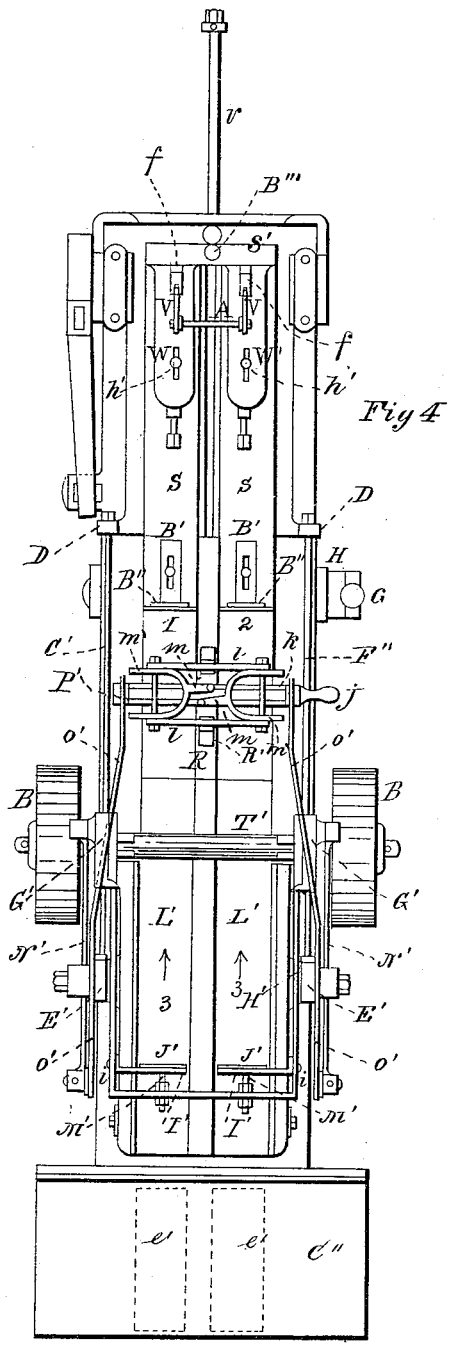
Figure 5:
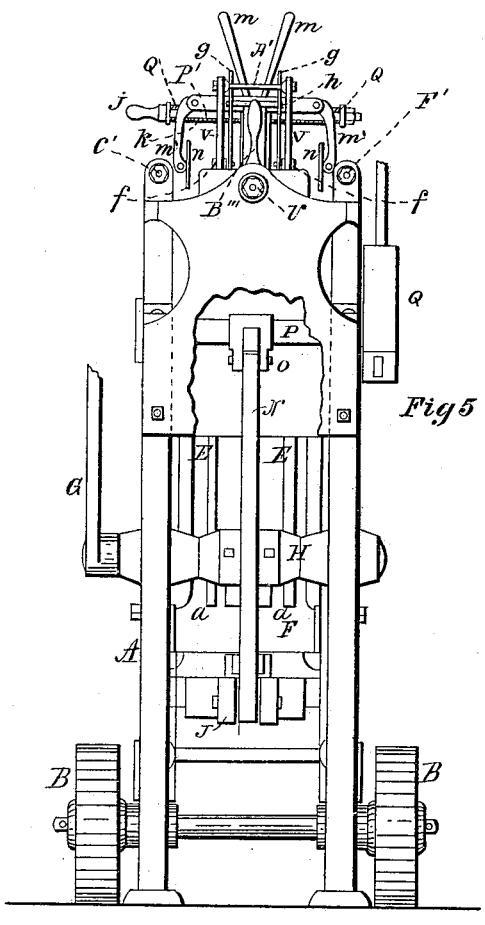

In the said drawings, Figure 1 represents a side elevation of the machine. Fig. 2 is a view of the opposite side of the machine, partly in section. Fig. 3 is an end view of the machine, partly in section. Fig. 4 is a plan view. Fig. 5 is a full end view of the machine. Figs. 6, 7, 8, 9, 10, 11, 12, 13, 14, and 15 are detached sections.
Like letters of reference denote like parts in the drawings.

The working parts of the above said machine are arranged upon and within the frame A, Figs. 1 and 2, one end of which is supported on a pair of wheels, B B, whereas the opposite end rests upon the ground. Within the frame is arranged a press consisting of a rectangular box, C, Fig. 2. (Shown in section.) An outside view of the box is shown in Fig. 1 at C. Said box is divided by a partition, R, into two compartments, 1 and 2, each of which is the shape and size of a brick. Both compartments are provided with a bottom, and which are supported in the press-box on the ends of the stanchions E E, Figs. 3 and 5, to which they are secured and braced by the re-enforcing webs *a a*. The lower ends of the stanchions terminate in a cross-head, F, thereby forming a frame for supporting the bottom in the press-box. The ends of the cross-head project, respectively, through the sides of the frame A. Elongated openings are made in the frame for that purpose and serve as guides for the reciprocal vertical movement of the cross-head when actuated for raising and lowering the floors of the press, for a purpose presently shown. One of said elongated openings and the ends of the cross-head therein are shown at F' in Figs. 1 and 15. The said bottom is raised and lowered in the press-box by a lever, G, Figs. 1, 4, and 5, attached to the end of a rock-shaft, H, journaled in the sides of the frame of the machine.

From the middle of the rock-shaft projects an arm, I, Fig. 2, the end of which is a rounded head adapted to fit closely, but free, in an opening in the cross-head, as shown in Fig. 2. Now, on a proper action of the lever G, the shaft is rocked, and the arm accordingly will raise the cross-head, and consequently the floors of the press-box, or lower the same when raised, as the case may be.

The platform or floors above described of the press is operated for pressing by a lever, J, Fig. 2. The fulcrum end of the said lever is provided with a head, K, Figs. 2 and 3, having therein a triangular-shaped hole, *b*, in which is inserted a flat bar of metal, L, the projecting ends of which respectively rest in the sides of the frame, as seen in the drawings. Said bar is the fulcrum of the lever J, on the upper edge of which the upper angle of the hole rests, thereby forming the vibratory axis of the lever, as seen in Fig. 2. Transversely on the upper side of the lever, and near the fulcrum thereof, is laid a bolster or bar, M, on which the cross-head F rests, and the weight of the platform is supported as seen in Fig. 2, in which it will be noticed that the upper and the lower side of the bolster are curved, thereby presenting but a small bearing-surface to the cross-head and to the surface of the lever, which will allow a free joint-like movement of the lever in its relation to the cross-head for operating the platform for pressing brick, as hereinafter shown.

For working the lever J for the purpose specified, the free end of said lever is connected by a rod, N, to an arm, O, Fig. 5, projecting from a shaft, P, having its bearings in the frame of the machine. A detached view of the lever, connecting-rod, arm O, and the shaft P is shown in Fig. 12; also indicated by dotted lines in Figs. 1 and 2 by the same letters of reference. To the end of the shaft P is secured a hand-lever, Q, Figs. 2 and 3, for operating the shaft P, and thereby the lever J, for working the press, as hereinafter shown.

As above mentioned, the press-box alluded to is divided into two compartments, 1 and 2, by a partition, R, Figs. 2 and 4. An enlarged plan view of the press-box is shown in Fig. 14. Each of said compartments is about the size and shape of a brick, and in which the brick or bricks are placed for being pressed. The said compartments are practically molds. Each of the molds is provided with a cover consisting of the slides S S. In Figs. 1 and 4 detached views of the slides are shown; in Figs. 7 and 8, plan and side views of the slides, the one being a duplicate of the other; hence a description of one will serve for both. The two slides are connected together by a head, S', as is seen in Figs. 8 and 10, and are adapted to slide in the top of the frame and over the press-box in the way-grooves T, Fig. 3. The edges of the slides are rabbeted for that purpose. U is a guide-rod attached to the connected ends of the slides. Each slide consists of two sections, $a'$ and $b$, Fig. 7. It will be noticed in said figure that the upper side of section $a'$ slants downward from the end $c$ to the end $d$, forming a wedge of said section $a'$, and that the upper section of the slide is also slanting, but in the reverse direction, so that the two sections lying one upon the other are in effect two wedges, $a'$ being the lower one, and $b$ the upper one. $a'$ is longitudinally movable by a lever, V, pivoted in the flange W, Figs. 1 and 4, by which the head S' is attached to the slides. The lower end of the lever is in connection with the lower section or wedge, $a'$, of the slide, as indicated by the dotted lines $e$ in Fig. 7. By connecting the lower end of the lever V to the section or wedge $a'$ of the slide it will be obvious that, on operating the upper end of the lever, the wedge $a'$ will be moved in either direction lengthwise of the machine. Both slides S S are constructed alike, and both provided with a lever for actuating their lower section. The two levers are connected to each other by a bar, A', Fig. 5, and are thereby operated conjointly and simultaneously for moving the slides to and over the press-box and away therefrom, for a purpose presently shown.

To each of the levers V, above described, is pivoted a dog, $f$, Figs. 1, 4, and 5, the free ends of which extend to and abut against the upper part of the head S', as seen in Figs. 4 and 7. The use of said dogs is to prevent the levers V from being pulled in the direction of the arrow, and consequently hold the lower sections or wedges of the slides from moving in the opposite direction of the arrow. The lower sections of the slides are prevented from moving back much beyond the upper sections by their abutting against the lower part of the head S', as seen in Fig. 7, in which the end $c$ of the wedge $a'$ is shown in contact with the head S', and thereby checked from moving farther back or from under the upper section, $b$, of the slide, and in which condition the wedge $a'$ cannot be pushed forward by the lever, as the lever is checked by the dogs $f$, above described. The dogs $f$ are released from their engagement with the head S' by the lifting-rods $g$, Figs. 1 and 5, the lower ends of which are pivoted to the dogs, whereas the upper ends of the rods are attached to the cross-bar A' of the levers V, as follows: In the upper end of each of the said lifting-rods is an elongated loop, through which the cross-bar A' passes, and by said bar and loops the lifting-rods are retained in a proper position for lifting the dogs. The lifting-rods are connected to each other by a bar, $h$, so that the two rods may be lifted at once for checking the movement of the slides, as above mentioned. On the inner end of each of the slides is adjustably secured a check-plate, B'' B'', Figs. 4, 7, and 8, the use of which will presently appear.

Figure 6:
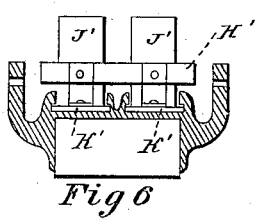

It will be observed in the drawings that the above-described slides are arranged on one side of the pressing-box. On the opposite side of the box is arranged the following mechanism, having a co-operative relation with the mechanism above described: Along one side of the top of the machine extends a guide-rod, C', Fig. 1, one end of which is secured in the stud D' and the other is made fast in the bracket E'. On the opposite side of the machine is a corresponding rod, F'', Fig. 4. (Shown more clearly in the enlarged view, Fig. 14.) On each of said guide-rods is a sleeve, G' G', free to slide thereon. To the inner sides of the sleeves G' G' are secured, respectively, the ends of the frame H'. To the sides, near the end of the frame, are attached the angle-irons I' by an ordinary set-screw, $i$, and a slot made in the frame, through which the screw passes into the angle-iron, and in which slot the screw may be moved for adjusting the angle-iron and the stop-plates J', secured thereto in any suitable way. Said stop-plates project upward, as seen in Figs. 1 and 6, and are facing the compartments 1 2 of the press-box, respectively. Both of the plates have a base, K' K'—an integral part of the plates—on which they stand and slide along the ways L' L', Figs. 4 and 14, of the frame.

For the purpose of adjusting the stop-plates in the frame is the intended use of the adjusting-screws M' M'. Presently further attention will be called to this part of the press mechanism.

To the sleeves G' G', above mentioned, are pivoted the ends of the links N' N', respectively. To the opposite ends of said links are jointed the ends of the arms O' O', pivoted to the sides of the brackets E', above alluded to, and as shown in Figs. 4 and 14. The opposite ends of the arms O' O' are respectively made fast to a bar, P', by the jam-nuts Q', Figs. 3 and 5. One end of said bar terminates in a handle, $j$. On the bar P', referred to, is a sleeve, $k$, loose thereon, that it may freely turn on the bar. To the sleeve is firmly secured a block, R', Figs. 1, 4, and 15. In the under side of the block is an angular groove adapted to fit the angular edge of the partition R of the press-box, as seen in Fig. 3.

On the upper side of the block are fixed a pair of arms, m m, Figs. 1, 3, and 4. Between the ends of the arms are hinged, respectively, the bifurcated levers m' m'. To the bifurcated ends of the levers is hinged a broad plate, n n, as shown in Figs. 3, 5, and 15. In said figures it will be noticed that the plates face the sides of the block R', respectively. The upper ends, m m, of the levers are a pair of handles, by which the opposite bifurcated ends and plates attached thereto are operated.

The above-described bifurcated levers and the plates hinged thereto form, in their relation to the block R' between them, a pair of swinging clamps, which, on closing the handles together, carries the bifurcated ends toward the block for clamping a brick between them, as hereinafter shown.

T', Figs. 2, 4, and 14, is a roller journaled in the sides of the frame of the machine, as seen in the said figures. The upper surface of the roller is flush with the ways L' L', as seen in Fig. 2. Said roller is arranged in an oil-tight trough or box, and as it revolves it becomes covered with the oil for oiling the under side of the bricks as they are carried forward to the pressing-box, as presently manifest. Under each of the slides S S and near the press-box is a cavity in which is an oiled sponge, as seen at U' in Fig. 2, over which the slides pass and their under sides become oiled, for a purpose hereinafter appearing. One only of the cavities is seen in the drawings—that referred to in Fig. 2—the other being a duplicate and similarly located, but not seen in the drawings.

The operation of the above-described machine is as follows: Let it be supposed that the condition of the machine, as shown in Figs. 2 and 4, is empty—that is to say, there are no bricks upon the machine nor in the press for being operated upon thereby—therefore, that there may be, the bottom or platform D of the press is pushed upward until its surface reaches the line p, Fig. 2, of the press, so that it may be level with the surface of the ways L' L'. This pushing upward of the bottom of the press is done by the arm I, operated by the lever G. The bricks to be pressed, two at a time, are such as are taken from the molds, and sufficiently hard and dry that they can be handled without their breaking. Two such bricks are placed, respectively, upon the ways L' L'. The bricks are then slid forward in the direction of the arrows 3 onto the bottom of the press, which is done by the operator, who, by the handle j, Fig. 4, lifts the clamping device above described (and to which the handle is attached) from its position shown in Fig. 4, and turns it back to the position shown in Figs. 14 and 15. This movement, as a consequence, draws the frame H' to the press, and as the frame moves along it pushes or draws the two bricks before it onto the platform or bottom of the press, the pushing being done by the plates J' J' in contact with the ends of the bricks as they were pushed or drawn along to the press by the frame. The two bricks now upon the platform of the press are respectively on each side of the partition R, as indicated by the dotted lines in Fig. 14. That the two bricks may not be pushed beyond the opening of the press is the purpose of the checks B'' B'', adjustably secured to the ends of the slides S S, as seen in Figs. 4, 7, and 8. The faces B'' of the checks are even or flush with the edge of the press, and thereby prevent the bricks from being pushed beyond said edge. The bricks thus landed upon the platform of the press are now lowered therein by the lever G, which, by a reverse action of that above described for raising the platform of the press, will lower the platform and the bricks into the press-box until the upper edges of the bricks are level with the ways L' L' and the plane on which the slides S S rest. The slides are now pushed forward over the press and bricks, which the operator does by the handle B''', Figs. 1 and 4, thereby forming a top or cover to the press-box, each slide covering its respective brick.

That the cover or slides may be close-fitting, to prevent the extrusion of the material of the bricks while under pressure, is the purpose of making the slides of long slender wedges, as above described, which when over the press the lower section, a', of the slide or slides are pushed wedgingly under the upper sections, b b, by means of the levers V V, above described, thereby thickening the slides, causing them to wedge tightly between the upper side of the grooves T T, Fig. 3, and the surface on which the slides rest when over the press, thereby making the slides tight-fitting in their connection with the press, for the purpose specified. The bricks, when thus confined in the press, are then subjected to pressure. The operator, by moving the handle or lever Q Fig. 2, in the direction of the arrow 4, operates the crank or arm O, which, by its connection with the lever J by the connecting-rod N, in turn operates the lever J by drawing its free end upward, causing the fulcrum end of the lever to force upward the platform and the bricks thereon in the press, and force them powerfully against the slides covering them. The pressing being done, the slides are then loosened by drawing back the sections or wedges a' by the levers V V, allowing the slide to be moved back from over the press for the removal of the pressed bricks therein.

It will be proper to say here that to allow the slides to move freely to and from the press, and to prevent the sections of the slides from moving upon each other while passing to and from the press, is the use of the dogs f f, which for that purpose remain with their free ends against the head S', as above mentioned. When the slides are over the press, the dogs are lifted up by the rods g g, to permit the levers V V to push the wedges a' forward for tightening the slides down upon the press, for the purpose above said.

The pressed bricks are removed from the press as follows: The handle or lever G, operated in the proper direction, will push upward the platform or bottom of the press again to and level with the surface on which the slides move and the bricks above the said surface, as when they were pushed thereon, as above described. The clamping mechanism hereinbefore described is then returned from the position shown in Figs. 14 and 15, to which it had been previously turned, to that shown in Figs. 1 and 4, so that the plates n n on the bifurcated ends of the levers will be respectively on the outer sides of the bricks, while the inner sides of the bricks will be close to the sides of the block R, against which the bricks will be clamped by the plates by closing together the arms m m of the clamps. At or about the time the clamps are fastened on the bricks two other unpressed bricks are placed on the ways L' L', as in the former instance. Now, as the operator with one hand holds the handles or arms m m of the clamps, thereby securely holding the bricks between the plates n n and the head R', with the other hand on the handle j he lifts the bricks and the clamping device upward, and which, by the above-described mechanism, is carried over to the end of the machine to the table C'', Figs. 1 and 4, on which the bricks are dropped, as indicated by dotted lines e', Figs. 4 and 15.

During the operation of conveying back the bricks from the press to the table the bricks above mentioned as being placed on the ways L' L' are pushed by the frame H' onto the platform of the press, which are then lowered therein and covered by the slides and pressed as in the former instance, which, when done, are removed from the press and conveyed over to the table, during which time two other unpressed bricks are being pushed by the frame to the press, and so on continuously as the press is operated—viz., while the pressed bricks are being conveyed from the press to the table other two bricks are being pushed by the frame H' to take their place in the press.

The unpressed bricks, as they slide over the roller T' to the press, are oiled thereby, to prevent them from sticking to the platform or bottom of the press. So, also, the slides, on passing over the oil saturated sponges, are oiled, to prevent the bricks from sticking to the under side of the slides.

The slides becoming worn and too thin to properly close the press for the purpose above specified, the upper section or sections, b b, of the slides can be moved forward by loosening the set-screws h', by which the head S' is secured to the slides. In this adjusting of the slides the thicker parts of the sections are made to slide upon each other, and thereby thicken up the slides, that they may wedge themselves when in place over the press.

In operating the lever J it can be retained in its pressing position by the connecting-link N, which, when the end of the lever is at its full height, said link will pass beyond the axial line of the shaft to which the arm is attached and rest against the back between the arms, and thereby continue to hold the bottom of the press up to maintain the pressure upon the bricks.

What I claim as my invention, and desire to secure by Letters Patent, is—

1. In a machine for pressing bricks, a press-box divided by a partition into two compartments, 1 and 2, of the shape and size of a brick, and arranged edgewise vertically, so that the bricks therein will be edgewise to the line of pressure and so pressed, and provided with a vertically-movable bottom, in combination with a pair of adjustable wedging-slides forming a top or cover to the press-box, constructed and arranged to operate in the manner substantially as described, and for the purpose set forth.

2. In combination with the vertically-movable bottom of the press-box, the lever J and bar L, passing through the head of said lever, and the edge of which is the vibratory axis or fulcrum of the lever, said lever being connected by a rod to the bifurcated arm O, projecting from the shaft P, and actuated by the handle Q for operating the lever J, forming, in connection with the said bifurcated arm and handle, a compound lever, for the purpose specified, and substantially as described.

3. In a machine for pressing bricks, the combination, with the cross-head F and stanchions supporting the bottom of the press-box, of the rock-shaft H, arm and lever G, and bolster for operating said shaft and arm, constructed and arranged to operate in the manner as described, substantially as described, and for the purpose specified.

4. In a machine for pressing bricks, the slides S S, constituting the cover of the press-box, and consisting of wedge-shape sections a' and b, imposed one upon the other, and adapted to slide in the way-grooves T T, along the inner sides of the frame of the machine, substantially as described, and for the purpose set forth.

5. In combination with the slides S S, the adjustable flange or flanges W, having pivoted therein the levers V V, the lower ends of which depend to the sections a' of the slides for operating the same, dogs pivoted to said levers, lifting-rods, and check-plates B'' B'', constructed and arranged to operate co-ordinately and jointly, for the purpose specified, and substantially as set forth.

6. In a machine for pressing bricks, the guide-rods C' C', arranged, respectively, on each side of the press-box, and having thereon reciprocally-movable sleeves, to the inner sides of which are pivoted, respectively, the ends of the frame H', and links N' N', having their ends respectively pivoted to the said sleeves and their opposite ends connected to the arms or levers O' O', substantially as described, and for the purpose specified.

7. In combination with the arms or levers O' O', a pair of swinging clamps, consisting of a bar, P', head or block R', suspended from said bar by a loosely-fitting sleeve, arms $l\,l$, and bifurcated levers pivoted in said arms, and provided with plates hinged to the bifurcated ends of the levers, constructed substantially as herein described, and for the purpose set forth.

In testimony whereof I affix my signature in presence of two witnesses.

JOHN BAILLIE.

Witnesses:
W. H. BURRIDGE,
J. W. BURRIDGE.